United States Patent
Weirich et al.

(10) Patent No.: US 11,555,383 B2
(45) Date of Patent: Jan. 17, 2023

(54) SAND CONTROL SCREEN ASSEMBLIES AND ASSOCIATED METHODS OF MANUFACTURING

(71) Applicant: Chevron U.S.A. Inc., San Ramon, CA (US)

(72) Inventors: John Barton Weirich, Spring, TX (US); Jeremy Alexander Davis, Humble, TX (US); Antonio Lazo, Midland, TX (US)

(73) Assignee: Chevron U.S.A. Inc., San ramon, CA (US)

( * ) Notice: Subject to any disclaimer, the term of this patent is extended or adjusted under 35 U.S.C. 154(b) by 74 days.

(21) Appl. No.: 16/976,058

(22) PCT Filed: Mar. 1, 2019

(86) PCT No.: PCT/IB2019/051644
§ 371 (c)(1),
(2) Date: Aug. 26, 2020

(87) PCT Pub. No.: WO2019/167002
PCT Pub. Date: Sep. 6, 2019

(65) Prior Publication Data
US 2020/0408073 A1 Dec. 31, 2020

Related U.S. Application Data

(60) Provisional application No. 62/637,131, filed on Mar. 1, 2018.

(51) Int. Cl.
*E21B 43/08* (2006.01)
*B01D 29/11* (2006.01)
(Continued)

(52) U.S. Cl.
CPC ............ *E21B 43/08* (2013.01); *E21B 43/084* (2013.01); *E21B 43/088* (2013.01);
(Continued)

(58) Field of Classification Search
CPC .... E21B 43/086; E21B 43/084; E21B 43/088; B01D 29/48; B01D 29/111; B01D 29/58; B01D 2201/0407
(Continued)

(56) References Cited

U.S. PATENT DOCUMENTS 5,307,984 A * 5/1994 Nagaoka ................ B01D 29/15
228/189
6,514,408 B1 * 2/2003 Simone .................. B01D 39/12
210/323.2

(Continued)

OTHER PUBLICATIONS

PCT International Search Report and Written Opinion, dated Jun. 24, 2019, issued in International Application No. PCT/IB2019/051644 filed on Mar. 1, 2019, 7 pages.

*Primary Examiner* — Robert E Fuller
*Assistant Examiner* — Neel Girish Patel
(74) *Attorney, Agent, or Firm* — King & Spalding LLP

(57) ABSTRACT

A sand control screen assembly includes a base pipe having openings through its thickness, and a mesh layer having mesh material sections coupled to safe edges, or connectors, for connecting sections together. The safe edges include areas of thinning to provide flex joints that yield when exposed to high stresses. The mesh layer may be a drainage layer or a filter medium of the sand control screen assembly.

20 Claims, 9 Drawing Sheets

(51) Int. Cl.
*B01D 29/48* (2006.01)
*B01D 29/58* (2006.01)

(52) U.S. Cl.
CPC .......... *B01D 29/111* (2013.01); *B01D 29/48* (2013.01); *B01D 29/58* (2013.01); *B01D 2201/0407* (2013.01); *E21B 43/086* (2013.01)

(58) Field of Classification Search
USPC .......................... 29/11, 15, 33; 210/497.01
See application file for complete search history.

(56) References Cited

U.S. PATENT DOCUMENTS

| | | | |
|---|---|---|---|
| 2006/0157256 A1* | 7/2006 | Hopkins | ................ B01D 29/15 |
| | | | 166/380 |
| 2007/0204465 A1 | 9/2007 | Huang et al. | |
| 2007/0256834 A1* | 11/2007 | Hopkins | ............... E21B 43/082 |
| | | | 166/278 |
| 2011/0240548 A1 | 10/2011 | Pionkowski et al. | |
| 2012/0152528 A1* | 6/2012 | Greci | ................... E21B 43/088 |
| | | | 166/227 |
| 2016/0258256 A1* | 9/2016 | Nguyen | .................... B22F 3/10 |
| 2018/0328151 A1* | 11/2018 | Wakefield | ............... E21B 43/10 |

\* cited by examiner

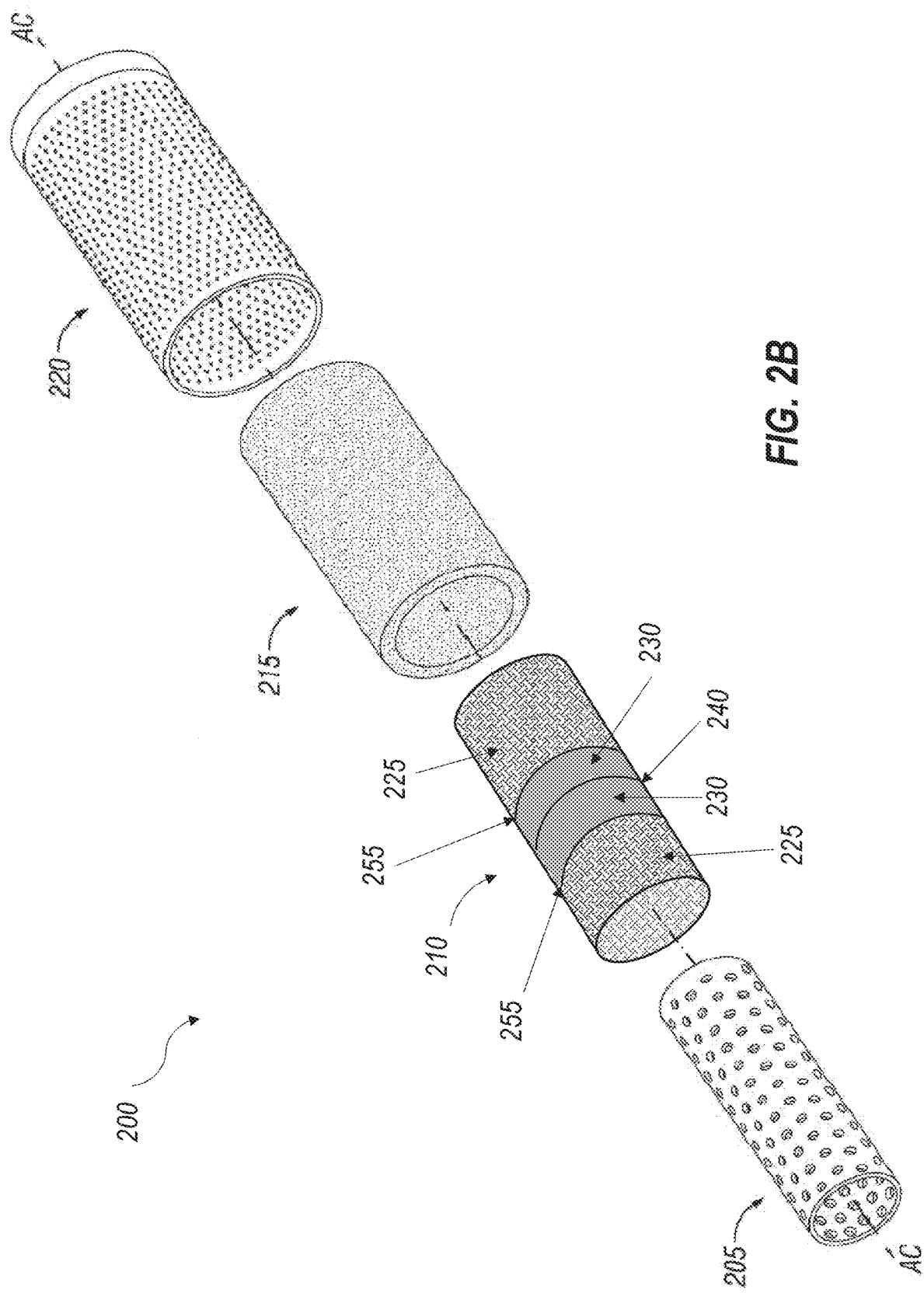

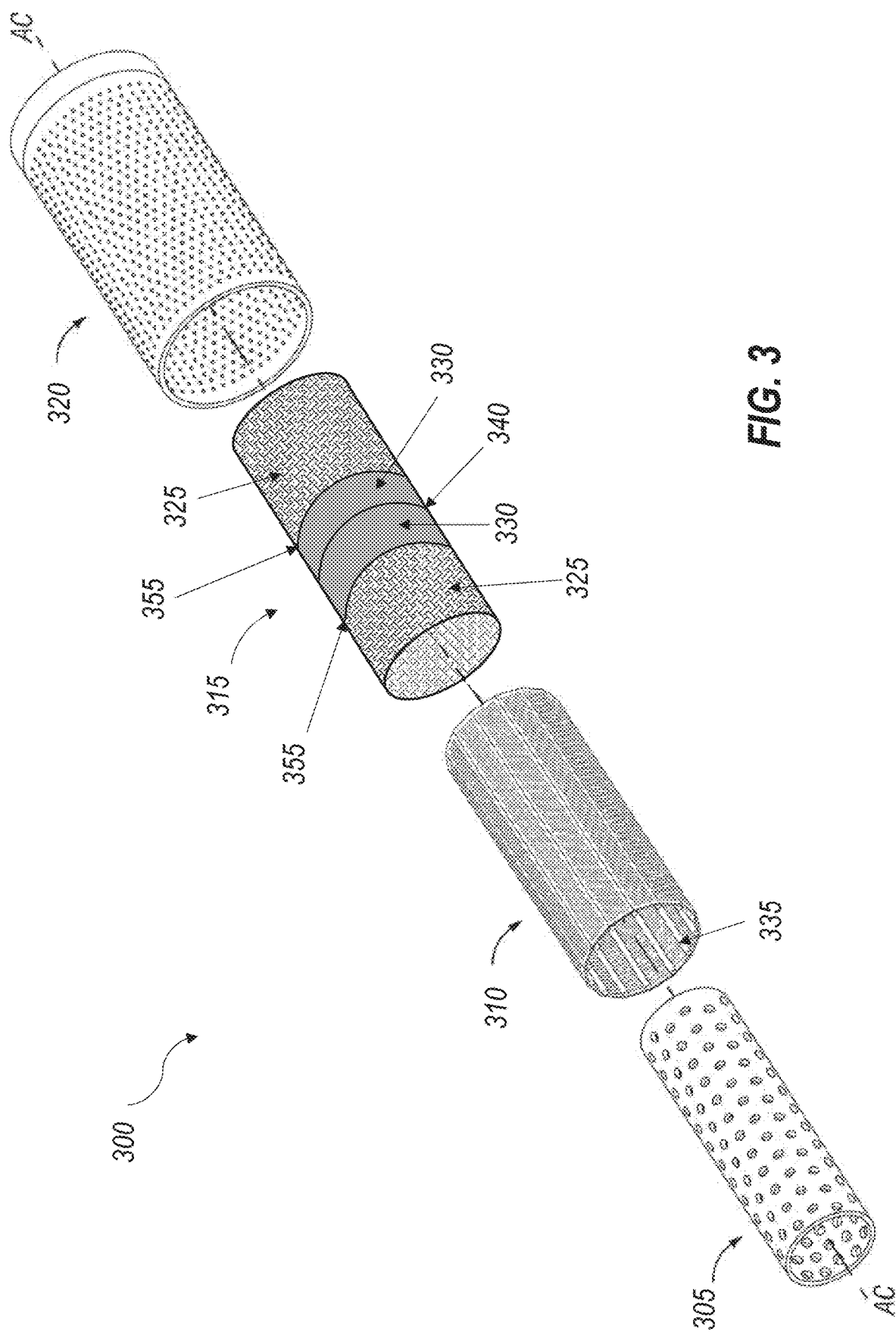

SAND CONTROL SCREEN ASSEMBLIES AND ASSOCIATED METHODS OF MANUFACTURING

CROSS REFERENCE TO RELATED APPLICATION

The present claims priority to U.S. Provisional Patent Application No. 62/637,131, filed Mar. 1, 2018, and titled "Sand Control Screen Assemblies And Associated Methods Of Manufacturing". The entire content of the foregoing application is hereby incorporated herein by reference.

TECHNICAL FIELD

The present application relates generally to structures adapted for filtering particulates from a flowing fluid in a wellbore that traverse a subterranean hydrocarbon bearing formation, and in particular, to methods of manufacturing and assembling filter media and/or other layers associated with and inherent to the construction for sand control screen assemblies.

BACKGROUND

Sand exclusion screen assemblies are employed in wellbores during the production of hydrocarbon fluids from subterranean formations. Conventional sand screen assemblies typically include a perforated base pipe, a drainage layer, a filter medium, and a protective jacket or shroud. Other layers may be included and labeled by differing vernacular as is deemed by those skilled in the art. Such screen assemblies are designed to filter out particles, such as formation sand or placed gravel/proppant, while facilitating the passage of hydrocarbon fluids into the wellbore. In some instances where mesh materials are used for the filter medium and/or the drainage layer, sections of the mesh material are coupled together to achieve a desired length by utilizing connectors (or safe edges) that are welded together. One drawback in the deployment of such screens is that the connection points between the mesh material and connectors may experience different stresses because the connectors are generally stronger than the mesh material of the filter medium and/or drainage layer. As a result of the differences in strengths, the mesh material typically deforms differently than the connectors, thus potentially leading to rupture of the mesh material.

Accordingly, a need has arisen for an improved method of manufacturing a safe edge that is welded to the filter medium and/or drainage layer for a sand control screen assembly that is capable of withstanding stress concentrations.

SUMMARY

Aspects of the present disclosure relate to a sand control screen assembly for use in a wellbore. In the present invention, the sand control screen assembly may comprise a base pipe having a plurality of openings through a thickness of the base pipe and a mesh layer positioned about the base pipe. In some embodiments, the mesh layer is a filter medium positioned about the base pipe. In some embodiments, a drainage layer is positioned about the base pipe and the mesh layer is a filter medium positioned about the drainage layer. In some embodiments, the mesh layer is a drainage layer positioned about the base pipe. The mesh layer includes a first mesh material section coupled to a first safe edge, or connector, and a second mesh material section coupled to a second safe edge, or connector. The two sections are coupled together, for instance, by welding the first safe edge to the second safe edge. The safe edge(s) include(s) one or more areas of thinned material, such as a groove. The areas of thinned material may be present on an inner surface or outer surface of the safe edge, thereby providing a nonuniform profile on the surface. In some embodiments, a support structure may be positioned under the mesh layer.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE FIGURES

FIG. 2B is an exploded view of the sand control screen assembly of FIG. 2A, according to an embodiment of the present disclosure.

FIG. 3 is an exploded view of a sand control screen assembly, according to another embodiment of the present disclosure.

DETAILED DESCRIPTION

Figure 1:
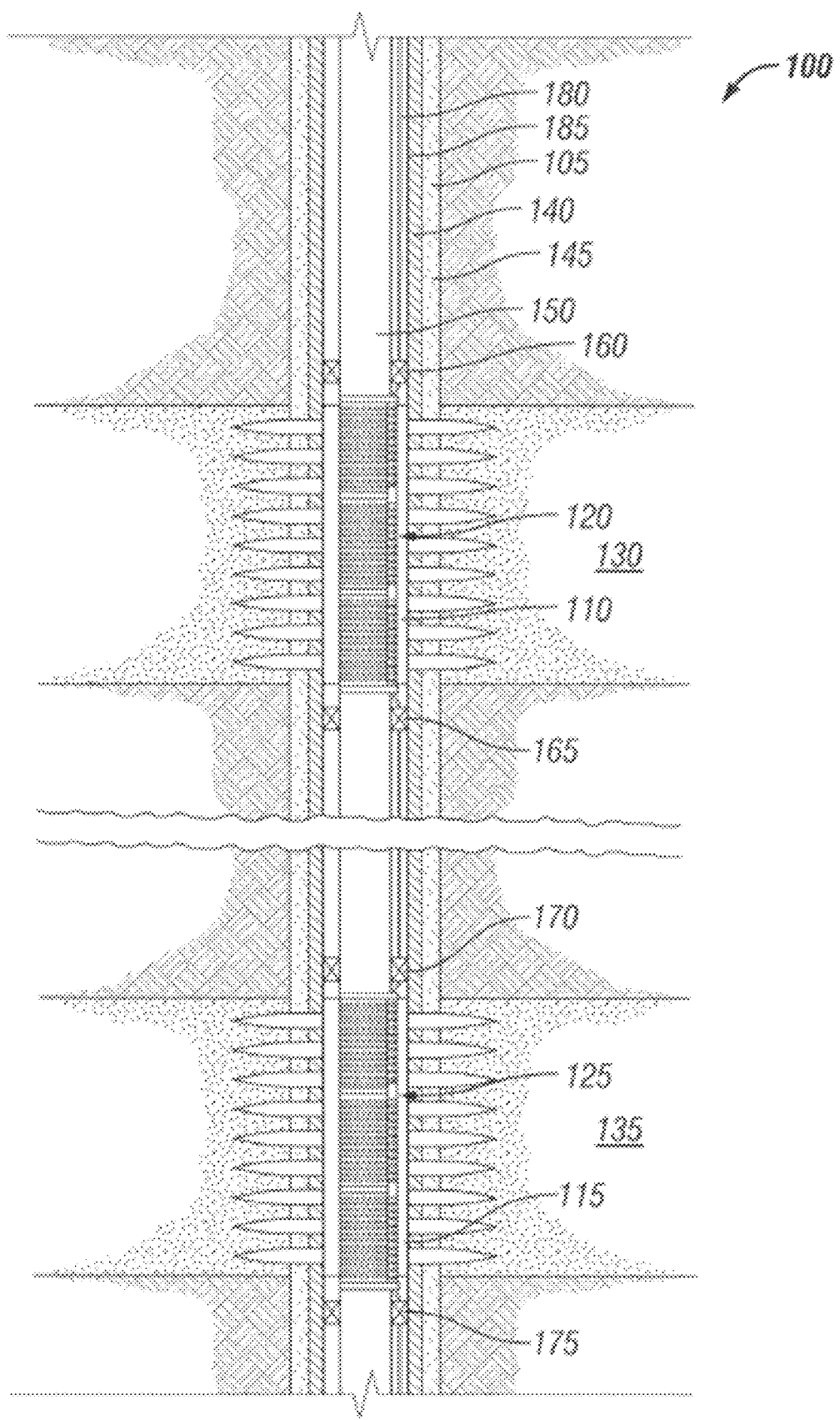
FIG. 1 is a schematic illustration of a wellbore environment including a pair of sand control screen assemblies, according to an embodiment of the present disclosure.

The present application provides sand control screen assemblies that have improved structural stability over conventional sand control screen assemblies.

The disclosure may be better understood by reading the following description of non-limitative, exemplary embodiments with reference to the attached drawings, wherein like parts of each of the figures are identified by the same reference characters. In the following description of the representative embodiments of the invention, directional terms, such as "above", "below", "upper", "lower", "inner", "outer", "top" "bottom", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore towards the bottom of the well.

Referring to FIG. 1, illustrated is a wellbore system 100 that may employ the principles of the present disclosure, according to one or more embodiments of the disclosure. As depicted, the wellbore system 100 includes a wellbore 105 having production intervals 110, 115, having sand control screen assemblies 120, 125, respectively, positioned therein. The wellbore 105 extends through various formations 130, 135 in the earth strata. A casing 140 is supported within wellbore 105 by cement 145. A production or completion string 150 includes various tools, such as sand control screen assembly 120 that is positioned within production interval 110 between packers 160, 165. In addition, the production or completion string 150 includes a sand control screen assembly 125 that is positioned within production interval 115 between packers 170, 175. The sand control screen assemblies 120, 125 serve the primary functions of filtering particulate matter out of the production fluid stream and may also include flow control capabilities or other additional functionality. One or more control lines 180 may extend from a ground surface within annulus 185 and pass through sand control screen assemblies 120, 125 to provide instructions, carry power, signals and data, and transport operating fluid, such as hydraulic fluid, to sensors, actuators and the like associated with sand control screen assemblies 120, 125 and other tools or components positioned downhole. Sensors (not shown) operably associated with production or completion string 150 may be used to provide valuable information to the operator via control line 180 during the production phase of the well, such as fluid temperature, pressure, velocity, constituent composition and the like, such that the operator can enhance the production operations.

Even though FIG. 1 depicts sand control screen assemblies 120, 125 in a cased hole environment, one skilled in the art will recognize that the sand control screen assemblies of the present invention are equally well suited for use in open hole environments. Also, even though FIG. 1 depicts a vertical completion, one skilled in the art will recognize that the sand control screen assemblies of the present invention are equally well suited for use in wells having other directional configurations including horizontal wells, deviated wells, multilateral wells, and the like.

Figure 2A:
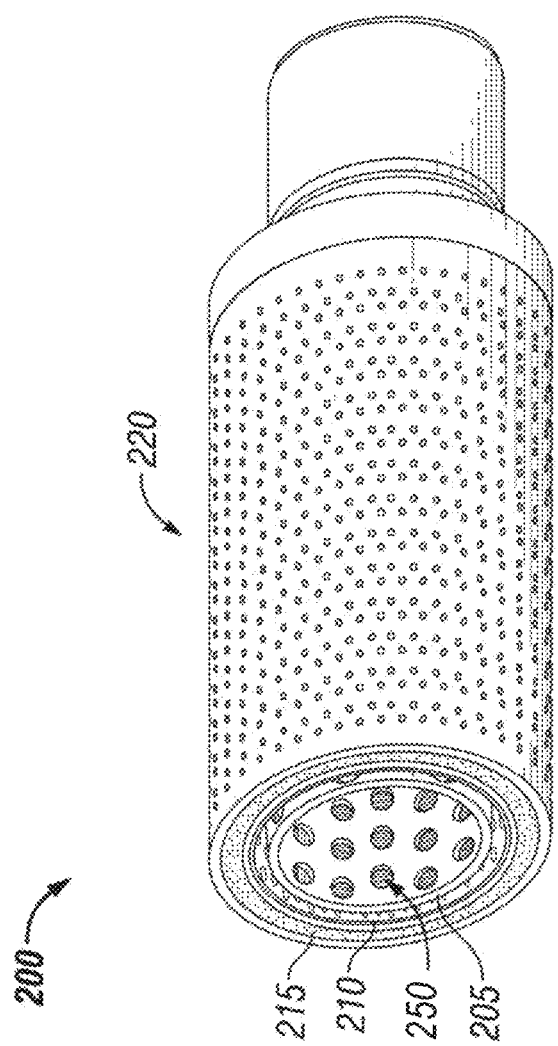
FIG. 2A is a top perspective view of a sand control screen assembly, according to an embodiment of the present disclosure.

FIGS. 2A-2B illustrate an exemplary embodiment of the present invention of a sand control screen assembly 200 for use in wellbore 105 (FIG. 1). Along with the other sand control screen assemblies described in the present application, the sand control screen assembly 200 may replace one or more of the screen assemblies 120, 125 described in FIG. 1 and may otherwise be used in the exemplary wellbore system 100 depicted therein. Any component within a sand screen is referred to herein as a sand screen component. Sand screen components can include a perforated base pipe, a filter medium, a protective jacket or shroud, as well as any material used to hold such sand screen components together or to each other, for example.

The screen assembly 200 generally includes a perforated base pipe 205, a drainage layer 210, a filter medium 215, and a protective jacket or shroud 220. Generally, during hydrocarbon production, fluid from the subterranean formation flows in a direction from the formation, through the shroud 220, and towards a central axis AC of the base pipe 205. The base pipe 205 provides structural support to the assembly 200, and also provides flow communication via openings 250 with the production or completion string 150 (FIG. 1) in the wellbore 105.

In certain exemplary embodiments, the drainage layer 210 is constructed from metal mesh materials 225 that are coupled together using connectors, or safe edges, 230 that are welded together at a joint 240. Generally, the drainage layer 210 may be a multi-layer laminated mesh, a single layer mesh, multiple wraps of woven material, weld compatible material, sintered mesh, diffusion bonded mesh, wire-wrapped screens, plain wire, or other porous structure.

The connectors 230 are constructed such that they deform in a relatively similar manner as the weave of the mesh material 225, thereby minimizing stress concentrations at the mesh-connector interface 255. In certain embodiments, the connectors 230 are constructed from annealed, or heat treated, 316L stainless steel. In certain embodiments, the connectors 230 have a thickness in the range of about 1 millimeter (mm) to about 3 mm, and are generally thinner than conventional connectors used in the industry. In certain embodiments, the connectors 230 include a series of areas of thinned material to create a "flex" joint that yields when exposed to high stresses. The areas of thinned material may be grooves that may be cut in, pleated in, folded in, rolled or pressed in. One having ordinary skill in the art will recognize there are a number of methods for modifying the connectors 230 to include areas of thinned material. In certain embodiments, the connectors 230 have a chemical composition of a multitude of materials with a material strength lower than currently commonly used. The flexibility of the modified connectors may reduce and/or eliminate the stress concentration at the connection points, thus proving for a higher collapse value. The drainage layer 210 is placed around the surface of the base pipe 205 and typically distributes inflow to the base pipe 205. In certain exemplary embodiments, a support structure 1205 (FIG. 12) may be included and positioned to limit differential deformation between the mesh screen and the connector.

The filter medium 215 that surrounds the drainage layer 210 is utilized for particle control and/or particle filtration of a predetermined size. In certain exemplary embodiments, the filter medium 215 is a woven mesh liner, for example, a single-layer mesh screen, or a multilayer mesh screen such as 2-layer, 4-layer, or any multitude of layers of woven mesh. In alternate embodiments, the filter medium 215 can be a wire-wrapped or slotted liner. Generally, the filter medium 215 may be a two or three-dimensional mesh, wire, or porous structure.

The shroud 220 surrounds the filter medium 215 and provides protection to the assembly 200 during installation. In certain exemplary embodiments, the shroud 220 is a perforated jacket. In alternative embodiments, the shroud 220 may be a wire-wrapped jacket, a slotted screen jacket, or a stamped jacket.

FIG. 3 illustrates another exemplary embodiment of a sand control screen assembly 300 for use in wellbore 105 (FIG. 1). Along with the other sand control screen assemblies described in the present application, the sand control screen assembly 300 may replace one or more of the screen assemblies 120, 125 described in FIG. 1 and may otherwise be used in the exemplary wellbore system 100 depicted therein. Any component within a sand screen is referred to herein as a sand screen component. Sand screen components can include a perforated base pipe, a filter medium, a protective jacket or shroud, as well as any material used to hold such sand screen components together or to each other, for example.

The sand control screen assembly 300 is the same as that described above with regard to sand control screen assembly 200, except as specifically stated below. For the sake of brevity, the similarities will not be repeated hereinbelow. Referring now to FIG. 3, the screen assembly 300 generally includes a perforated base pipe 305, a drainage layer 310, a mesh filter medium 315, and a protective jacket or shroud 320.

The drainage layer 310 occasionally is a slotted screen and includes a plurality of ribs 335 that are substantially symmetrically disposed or positioned about the central axis AC of the base pipe 305. In certain embodiments, the slotted screen is made up of wrapped wires. The drainage layer 310 is placed around the surface of the base pipe 305 and typically distributes inflow to the base pipe 305. In certain embodiments, the drainage layer 310, composed of the slotted screen and the plurality of ribs 335, can be replaced by other porous structures such as metal meshes. Generally, the drainage layer 310 may be a two or three-dimensional mesh, wire, or porous structure. In some embodiments, the drainage layer is a slotted screen, as described.

The filter medium 315 that surrounds the drainage layer 310 is utilized for particle control and/or particle filtration of a predetermined size. In certain exemplary embodiments, the filter medium 315 is a woven mesh liner, for example, a single-layer mesh screen, or a multilayer mesh screen such as 2-layer, 4-layer, or any multitude of layers of woven mesh. In certain exemplary embodiments, the filter medium 315 is constructed from metal mesh materials 325 that are coupled together using connectors, or safe edges, 330 that are welded together at a joint 340. The connectors 330 are constructed such that they deform in a relatively similar manner as the weave of the mesh material, thereby minimizing stress concentrations at the mesh-connector interface 355. In certain embodiments, the connectors 330 are constructed from annealed, or heat treated, 316L stainless steel. In certain embodiments, the connectors 330 have a thickness in the range of about 1 mm to about 3 mm, and are generally thinner than conventional connectors used in the industry. In certain embodiments, the connectors 330 include a series of areas of thinned material to create a "flex" joint that yields when exposed to high stresses. In certain exemplary embodiments, the areas of thinned material are grooves that may be cut in, pleated in, folded in, rolled or pressed in. One having ordinary skill in the art will recognize there are a number of methods for modifying the connectors 330 to include areas of thinned material. In certain embodiments, the connectors 330 have a chemical composition of a multitude of materials with a material strength lower than currently commonly used. The flexibility of the modified connectors may reduce and/or eliminate the stress concentration at the connection points, thus proving for a higher collapse value. The filter medium 315 is placed around the surface of the drainage layer 310 or the base pipe 305 (when a drainage layer is not present) and typically distributes inflow towards the base pipe 305. In certain exemplary embodiments, a support structure 1205 (FIG. 12) may be included and positioned to limit differential deformation between the mesh screen and the connector.

Figure 4:
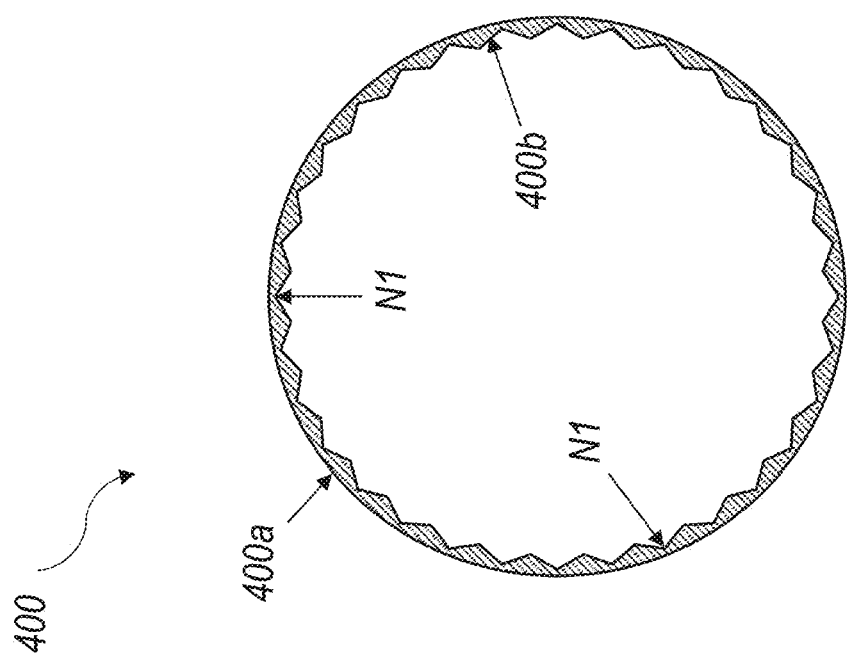
FIG. 4 is a side cross-sectional view of a connector, or safe edge, for coupling together mesh materials of a sand control screen assembly, according to an embodiment of the present disclosure.

FIG. 4 illustrates an exemplary embodiment of a connector, or safe edge, 400 for use in coupling together mesh materials 225 (FIG. 2B), 325 (FIG. 3). Along with the other connectors described in the present application, the connector 400 may replace one or more of the connectors 230, 330 described in FIGS. 2B, 3 and may otherwise be used in the sand control screen assemblies depicted therein.

Generally, the connector 400 includes an outer surface 400a and a nonuniform inner surface 400b. The nonuniform inner surface 400b includes a series of areas N1 of thinning or weakened material that create a "flex" joint that deforms when exposed to high stresses. In the embodiment shown in FIG. 4, the inner surface 400b of connector 400 is a generally smooth surface that includes 32 areas N1 having a V shaped groove, wherein the point of each groove provides a flex joint. One having ordinary skill in the art will recognize that the number and frequency of areas N1 can vary in different embodiments based on the size of the sand screen assembly, and is such that the stress concentrated at a point of flex is less than that stress required to cause rupture. In addition, the number and frequency of areas N1 are present such that it is suitable in environments whereby the connector 400 can survive corrosion, erosion, corrosion/erosion, or any other environmental degradation, while having sufficient strength to meet or exceed structural requirements, and while accommodating the manufacturing/fabrication process. One having ordinary skill in the art will recognize that the connector 400 may be constructed from any material suitable for use in downhole applications and/or compatible metallic materials (compatible with the metallurgy of the weave since these are typically welded), but can include other materials and attachment means, such as glue, if so deemed qualified for the application.

Figure 5:
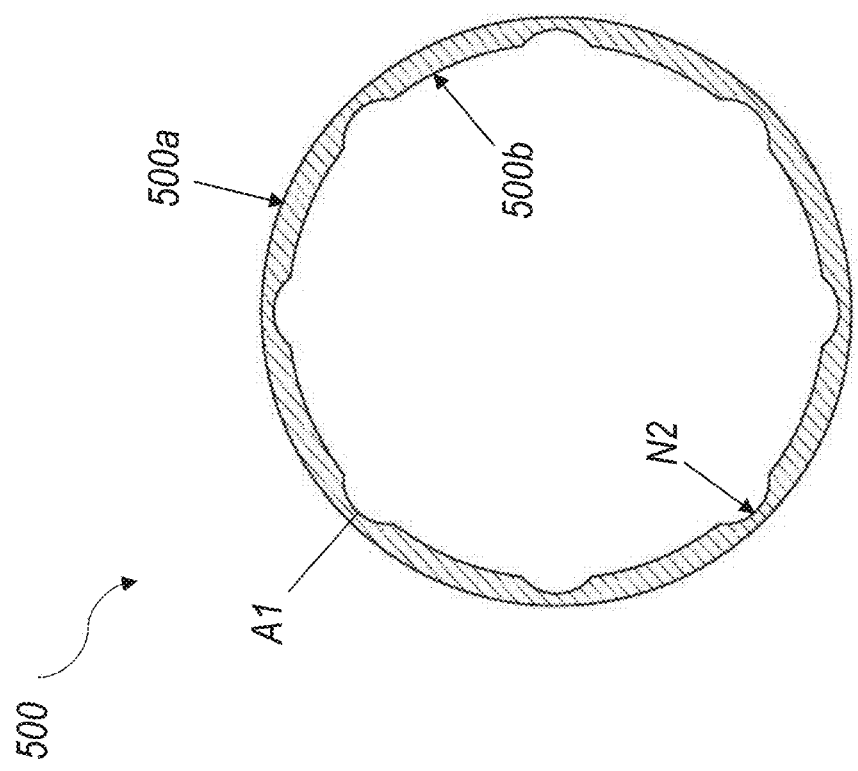
FIG. 5 is a side cross-sectional view of connector, or safe edge, for coupling together mesh materials of a sand control screen assembly, according to another embodiment of the present disclosure.

FIG. 5 illustrates an exemplary embodiment of a connector, or safe edge, 500 for use in coupling together mesh materials 225 (FIG. 2B), 325 (FIG. 3). Along with the other connectors described in the present application, the connector 500 may replace one or more of the connectors 230, 330 described in FIGS. 2B, 3 and may otherwise be used in the sand control screen assemblies depicted therein. The connector 500 is the same as that described above with regard to connector 400, except as specifically stated below. For the sake of brevity, the similarities will not be repeated hereinbelow.

Generally, the connector 500 includes an outer surface 500a and a nonuniform inner surface 500b. The nonuniform inner surface 500b includes a series of areas N2, similar to areas N1, of thinning or weakened material. In the embodiment shown in FIG. 5, the connector 500 includes eight areas N2 having an arced groove, wherein the apex A1 of each arc provides a flex joint. One having ordinary skill in the art will recognize that the number and frequency of areas N2 can vary in different embodiments.

Figure 6:
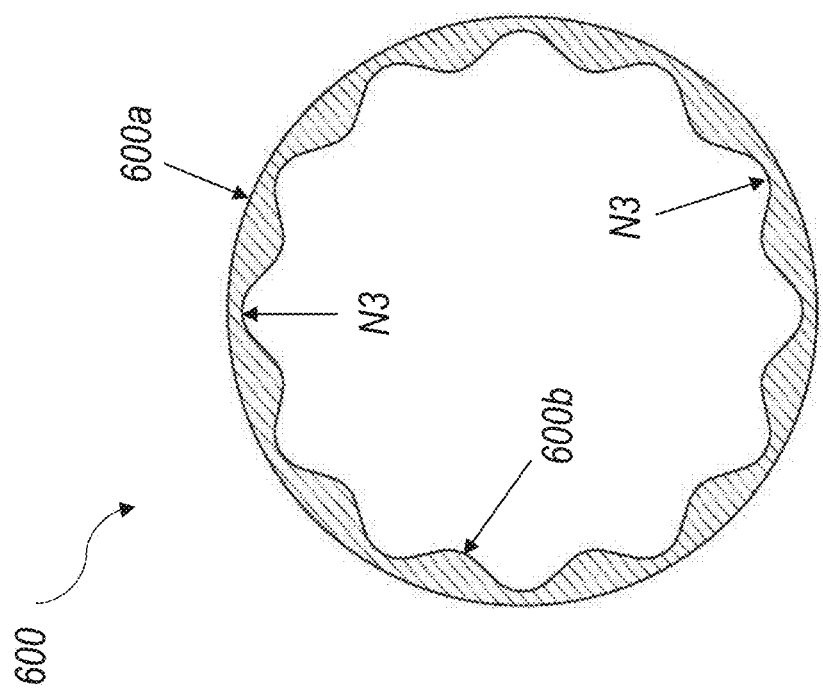
FIG. 6 is a side cross-sectional view of connector, or safe edge, for coupling together mesh materials of a sand control screen assembly, according to yet another embodiment of the present disclosure.

FIG. 6 illustrates an exemplary embodiment of a connector, or safe edge, 600 for use in coupling together mesh materials 225 (FIG. 2B), 325 (FIG. 3). Along with the other connectors described in the present application, the connector 600 may replace one or more of the connectors 230, 330 described in FIGS. 2B, 3 and may otherwise be used in the sand control screen assemblies depicted therein. The connector 600 is the same as that described above with regard to connector 400, except as specifically stated below. For the sake of brevity, the similarities will not be repeated herein below.

Generally, the connector 600 includes an outer surface 600a and a nonuniform inner surface 600b. The nonuniform inner surface 600b includes a series of areas N3, similar to areas N1, of thinning or weakened material. In the embodiment shown in FIG. 6, the inner surface 600b of the connector 600 includes a curved surface having "waves" creating the areas N3 that provide a flex joint.

Figure 7:
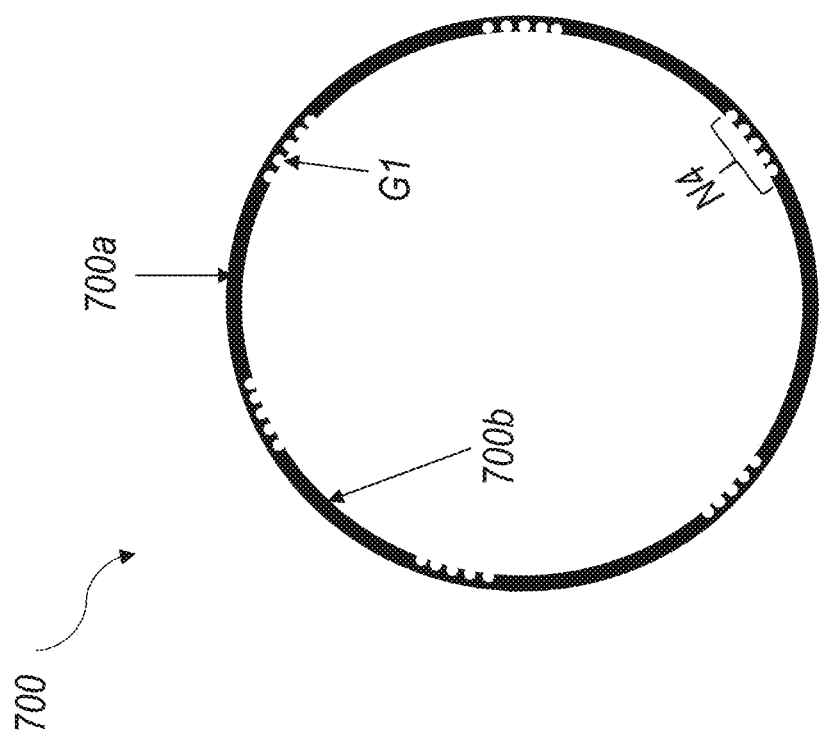
FIG. 7 is a side cross-sectional view of connector, or safe edge, for coupling together mesh materials of a sand control screen assembly, according to yet another embodiment of the present disclosure.

FIG. 7 illustrates an exemplary embodiment of a connector, or safe edge, 700 for use in coupling together mesh materials 225 (FIG. 2B), 325 (FIG. 3). Along with the other connectors described in the present application, the connector 700 may replace one or more of the connectors 230, 330 described in FIGS. 2B, 3 and may otherwise be used in the sand control screen assemblies depicted therein. The connector 700 is the same as that described above with regard to connector 400, except as specifically stated below. For the sake of brevity, the similarities will not be repeated herein below.

Generally, the connector 700 includes an outer surface 700a and a nonuniform inner surface 700b. The nonuniform inner surface 700b includes a series of grooves G1 that provide areas N4 of thinning or weakened material. In the embodiment shown in FIG. 7, each area N4 includes five grooves G1. One having ordinary skill in the art will recognize that the number of grooves G1 and frequency of areas N4 along the inner surface 700b can vary in different embodiments.

Figure 8:
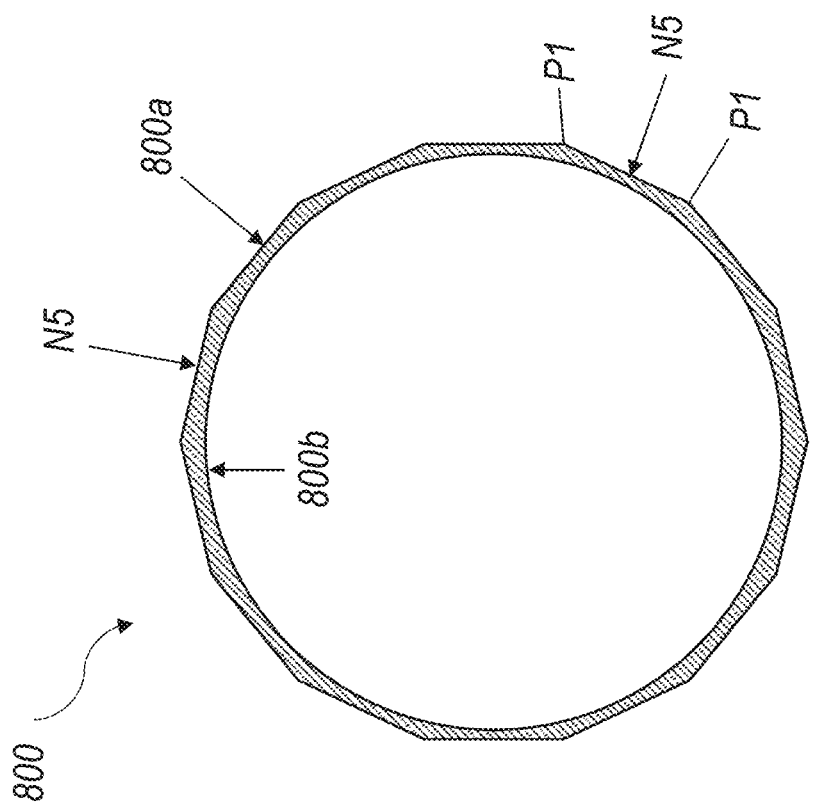
FIG. 8 is a side cross-sectional view of connector, or safe edge, for coupling together mesh materials of a sand control screen assembly, according to yet another embodiment of the present disclosure.

FIG. 8 illustrates an exemplary embodiment of a connector, or safe edge, 800 for use in coupling together mesh materials 225 (FIG. 2B), 325 (FIG. 3). Along with the other connectors described in the present application, the connector 800 may replace one or more of the connectors 230, 330 described in FIGS. 2B, 3 and may otherwise be used in the sand control screen assemblies depicted therein. The connector 800 is the same as that described above with regard to connector 400, except as specifically stated below. For the sake of brevity, the similarities will not be repeated herein below.

Generally, the connector 800 includes a nonuniform outer surface 800a and a smooth inner surface 800b. The nonuniform outer surface 800a includes a series of areas N5, similar to areas N1, of thinning or weakened material. In the embodiment shown in FIG. 8, the outer surface 800a of connector 800 includes 14 areas N5 positioned between points P1 of the tetradecagon shown, wherein each of the areas N5 provides a flex joint. One having ordinary skill in the art will recognize that the number and frequency of areas N5 can vary in different embodiments.

Figure 9:
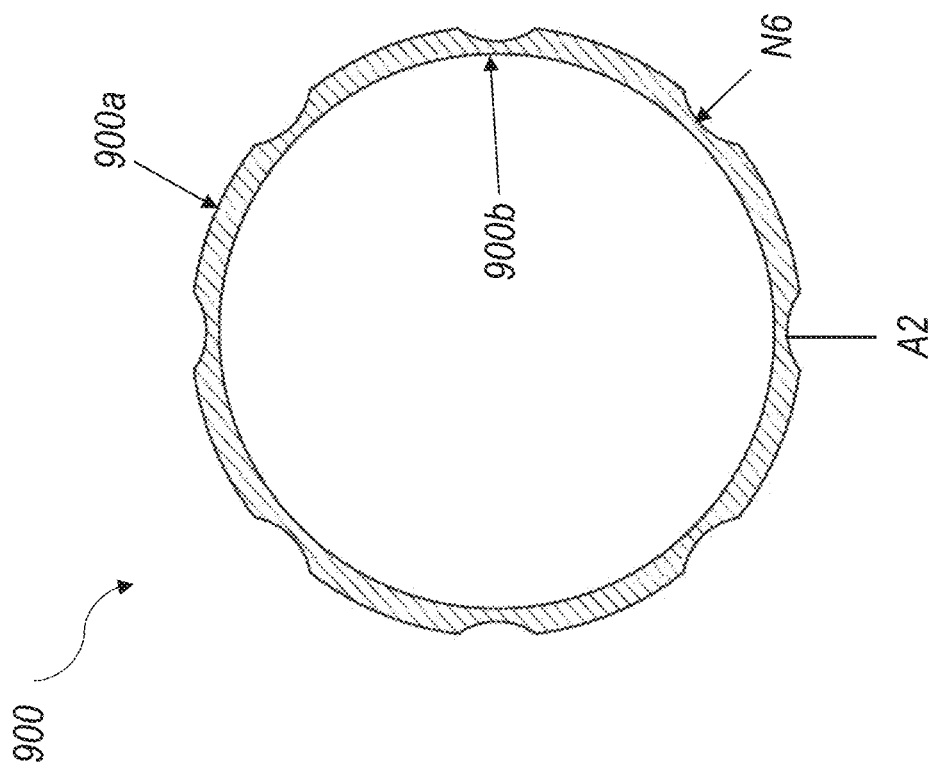
FIG. 9 is a side cross-sectional view of connector, or safe edge, for coupling together mesh materials of a sand control screen assembly, according to yet another embodiment of the present disclosure.

FIG. 9 illustrates an exemplary embodiment of a connector, or safe edge, 900 for use in coupling together mesh materials 225 (FIG. 2B), 325 (FIG. 3). Along with the other connectors described in the present application, the connector 900 may replace one or more of the connectors 230, 330 described in FIGS. 2B, 3 and may otherwise be used in the sand control screen assemblies depicted therein. The connector 900 is the same as that described above with regard to connector 800, except as specifically stated below. For the sake of brevity, the similarities will not be repeated hereinbelow.

Generally, the connector 900 includes a nonuniform outer surface 900a and an inner surface 900b. The nonuniform outer surface 900a includes a series of areas N6, similar to areas N5, of thinning or weakened material. In the embodiment shown in FIG. 9, the connector 900 includes eight arc-shaped areas N6 each creating a groove in the outer surface 900a, wherein the apex A2 of each arc provides a flex joint. One having ordinary skill in the art will recognize that the number and frequency of areas N6 can vary in different embodiments.

Figure 10:
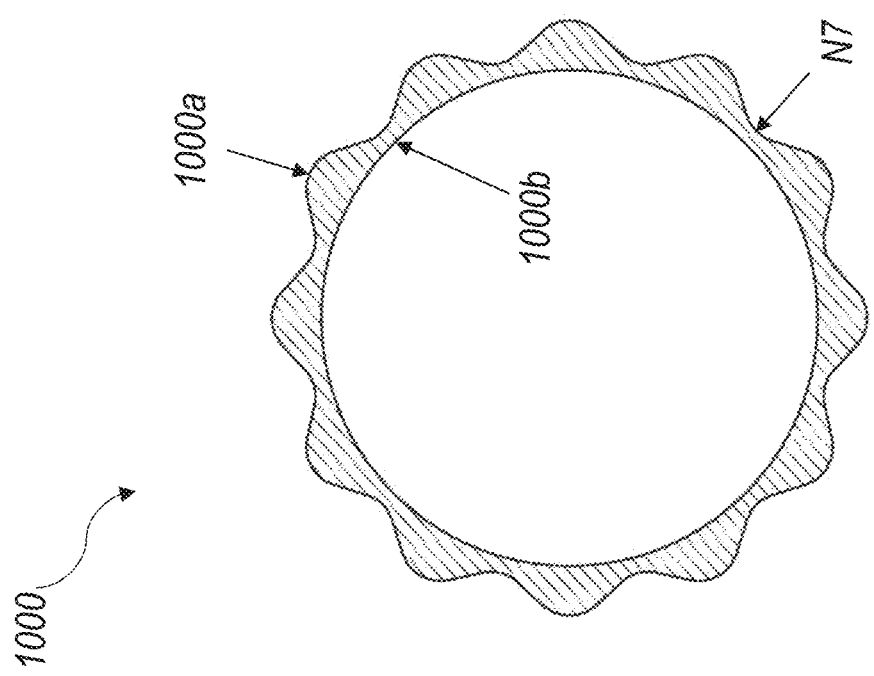
FIG. 10 is a side cross-sectional view of connector, or safe edge, for coupling together mesh materials of a sand control screen assembly, according to yet another embodiment of the present disclosure.

FIG. 10 illustrates an exemplary embodiment of a connector, or safe edge, 1000 for use in coupling together mesh materials 225 (FIG. 2B), 325 (FIG. 3). Along with the other connectors described in the present application, the connector 1000 may replace one or more of the connectors 230, 330 described in FIGS. 2B, 3 and may otherwise be used in the sand control screen assemblies depicted therein. The connector 1000 is the same as that described above with regard to connector 800, except as specifically stated below. For the sake of brevity, the similarities will not be repeated hereinbelow.

Generally, the connector 1000 includes a nonuniform outer surface 1000a and an inner surface 1000b. The nonuniform outer surface 1000a includes a series of areas N7, similar to areas N5, of thinning or weakened material. In the embodiment shown in FIG. 10, the outer surface 1000a of the connector 1000 includes a curved surface having "waves" creating the areas N5 that provide a flex joint.

Figure 11:
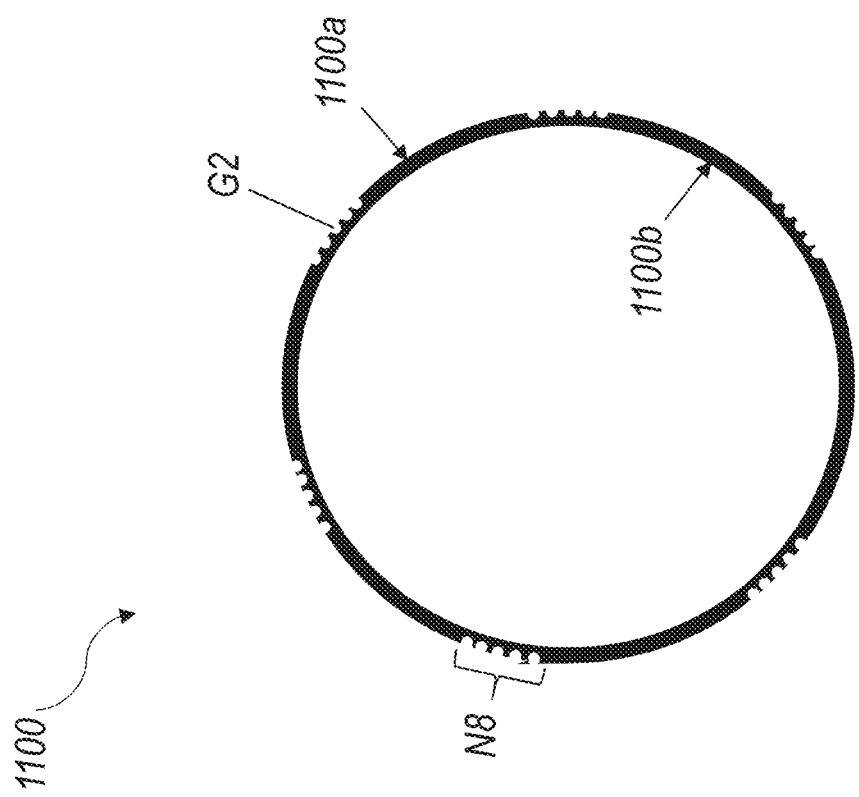
FIG. 11 is a side cross-sectional view of connector, or safe edge, for coupling together mesh materials of a sand control screen assembly, according to yet another embodiment of the present disclosure.

FIG. 11 illustrates an exemplary embodiment of a connector, or safe edge, 1100 for use in coupling together mesh materials 225 (FIG. 2B), 325 (FIG. 3). Along with the other connectors described in the present application, the connector 1100 may replace one or more of the connectors 230, 330 described in FIGS. 2B, 3 and may otherwise be used in the sand control screen assemblies depicted therein. The connector 1100 is the same as that described above with regard to connector 800, except as specifically stated below. For the sake of brevity, the similarities will not be repeated hereinbelow.

Generally, the connector 1100 includes a nonuniform outer surface 1100a and an inner surface 1100b. The nonuniform outer surface 1100a includes a series of grooves G2 that provide areas N8 of thinning or weakened material. In the embodiment shown in FIG. 1, each area N8 includes five grooves G2. One having ordinary skill in the art will recognize that the number of grooves G2 and frequency of areas N8 along the outer surface 1100a can vary in different embodiments.

Figure 12:
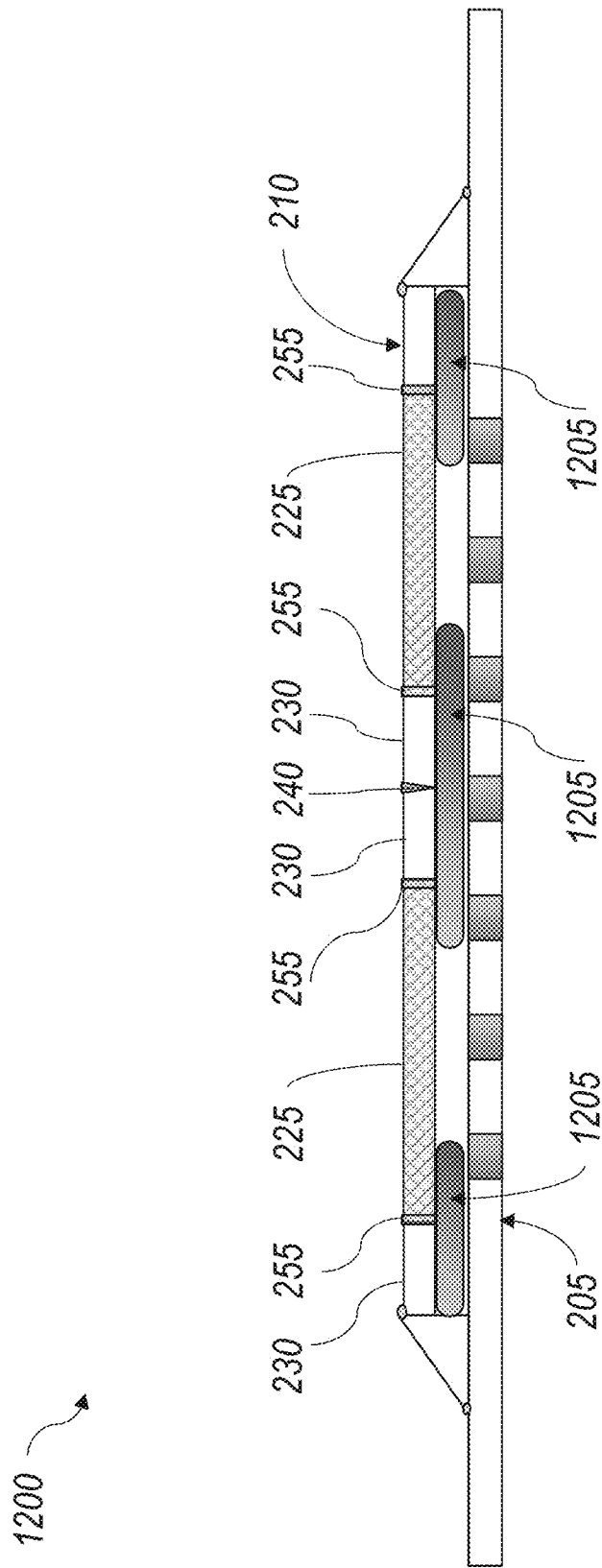
FIG. 12 is a side cross-sectional view of a partial section of drainage layer and base pipe of a sand control screen assembly, according to an embodiment of the present disclosure.

FIG. 12 illustrates an exemplary embodiment of a sand control screen assembly filtration and/or drainage layer-base pipe system 1200. The system 1200 includes drainage layer 210 positioned about a base pipe 205 (FIGS. 2A-2B). The drainage layer-base pipe system 1200 is the same as the drainage layer 210-base pipe 205 system described above in screen assembly 200, except as specifically stated below. For the sake of brevity, the similarities will not be repeated hereinbelow.

In certain exemplary embodiments, the sand control screen assembly filtration and/or drainage layer-base pipe system 1200 may include support structures 1205 positioned under weld joint 240 and/or mesh-connector interface 255, between the base pipe 205 and the drainage layer 210. The support structures 1205 may be positioned to limit differential deformation between the mesh material 225 and the connector 230, thus minimizing or eliminating stress. In certain exemplary embodiments, the support structures 1205 may be designed to yield in a preferential way such that there is a gradual slope to an end of the support structure 1205 and therefore, the mesh material 225 is not subjected to high stress at concentrated locations. While not shown, similarly, in certain embodiments, support structures may be present between drainage layer 310 and filter medium 315 (FIG. 3), where filter medium 315 includes safe edges, or connectors 330.

One having ordinary skill in the art will recognize there are a number of methods for modifying safe edges, or connectors, to include areas of thinning or weakened material. In certain embodiments, the connectors have a chemical composition of a multitude of materials with a material strength lower than currently commonly used. The flexibility of the modified connectors may reduce and/or eliminate the stress concentration at the connection points, thus providing for a higher collapse value.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A sand control screen assembly comprising:
    a base pipe having a plurality of openings through a thickness of the base pipe; and
    a mesh layer positioned about the base pipe,
        wherein the mesh layer comprises a first section and a second section,
        wherein the first section comprises a first mesh component coupled to a first safe edge,
        wherein the second section comprises a second mesh component coupled to a second safe edge,
        wherein the first section is coupled to the second section by coupling the first safe edge to the second safe edge, and
        wherein at least one of the safe edges includes a plurality of areas of thinning located in series in a circumferential direction along an inner surface or an outer surface of the at least one of the safe edges.

2. The sand control screen assembly of claim 1, wherein the mesh layer is a drainage layer.

3. The sand control screen assembly of claim 2, further comprising:
    a weld joint joining the first safe edge and the second safe edge; and
    a support structure positioned under the weld joint, the support structure located between the base pipe and the drainage layer.

4. The sand control screen assembly of claim 1, wherein the mesh layer is a filter medium.

5. The sand control screen assembly of claim 4, further comprising a drainage layer positioned between the base pipe and the filter medium.

6. The sand control screen assembly of claim 4, further comprising a support structure positioned under the filter medium.

7. The sand control screen assembly of claim 1, further comprising a shroud positioned about the mesh layer.

8. The sand control screen assembly of claim 1, wherein the first and second mesh components are constructed from at least one of a woven metal, weld compatible material, sintered mesh, diffusion bonded mesh, or other porous metal structure.

9. The sand control screen assembly of claim 1, wherein the plurality of areas of thinning comprises at least one groove in the inner surface of the safe edge.

10. The sand control screen assembly of claim 9, wherein the plurality of areas of thinning have a side cross-sectional profile that is V-shaped, curved, circular, or arced.

11. The sand control screen assembly of claim 1, wherein the inner surface of the safe edge is nonuniform.

12. The sand control screen assembly of claim 1, wherein the inner surface of the safe edge has a wave-like profile.

13. The sand control screen assembly of claim 1, wherein the plurality of areas of thinning comprises at least one groove in the outer surface of the safe edge.

14. The sand control screen assembly of claim 13, wherein the plurality of areas of thinning have a side cross-sectional profile that is V-shaped, curved, circular, or arced.

15. The sand control screen assembly of claim 1, wherein the outer surface of the safe edge is nonuniform.

16. The sand control screen assembly of claim 1, wherein the outer surface of the safe edge has a wave-like profile.

17. The sand control screen assembly of claim 1, wherein the first mesh component is welded to the first safe edge, wherein the second mesh component is welded to the second safe edge, and wherein the first section is coupled to the second section by welding the first safe edge to the second safe edge.

18. A sand control screen assembly comprising:
    a base pipe having a plurality of openings through a thickness of the base pipe;
    a drainage layer positioned about the base pipe; and
    a filter medium positioned about the drainage layer,
        wherein the filter medium comprises a first mesh layer section and a second mesh layer section,
        wherein the first mesh layer section comprises a first mesh component coupled to a first safe edge,
        wherein the second mesh layer section comprises a second mesh component coupled to a second safe edge,
        wherein the first mesh layer section is coupled to the second mesh layer section by coupling the first safe edge to the second safe edge, and
        wherein at least one of an inner surface and outer surface of the safe edges has a plurality of areas of thinning located in series in a circumferential direction along the inner surface or the outer surface of at least one of the safe edges.

19. The sand control screen assembly of claim 18, wherein the inner surface of the safe edge has the plurality of areas of thinning.

20. The sand control screen assembly of claim 18, wherein the outer surface of the safe edge has the plurality of areas of thinning.

* * * * *